United States Patent [19]

Minegishi et al.

[11] Patent Number: 4,594,209
[45] Date of Patent: Jun. 10, 1986

[54] PROCESS FOR THE PREPARATION OF VOLTAGE NON-LINEARITY TYPE RESISTORS

[75] Inventors: Keiichi Minegishi; Tokuji Akiba; Keiichi Katayama; Hiroshi Machida, all of Saitama, Japan

[73] Assignee: Chichibu Cement Co., Ltd., Tokyo, Japan

[21] Appl. No.: 592,095

[22] Filed: Mar. 22, 1984

[30] Foreign Application Priority Data

Mar. 22, 1983 [JP] Japan .................................. 58-45913

[51] Int. Cl.⁴ ............................................. C04B 33/02
[52] U.S. Cl. ..................... 264/66; 252/519; 264/61; 338/21
[58] Field of Search ...................... 264/61, 66; 252/519

[56] References Cited

U.S. PATENT DOCUMENTS

| | | | |
|---|---|---|---|
| 3,903,226 | 9/1975 | Iga et al. ................. | 264/61 |
| 3,962,144 | 6/1976 | Matsuura et al. .......... | 252/519 |
| 4,094,061 | 6/1978 | Gupta et al. ............. | 264/66 |
| 4,165,351 | 8/1979 | May ....................... | 264/66 |
| 4,297,250 | 10/1981 | Gupta et al. ............. | 264/66 |

FOREIGN PATENT DOCUMENTS 82059224 12/1982 Japan .................................. 252/219

*Primary Examiner*—James Derrington
*Attorney, Agent, or Firm*—Birch, Stewart, Kolasch & Birch

[57] ABSTRACT

A voltage non-linearity type resistor and a process for the preparation of a voltage non-linearity type resistor wherein pre-sintering is effected at a temperature of no lower than 700° C. with a basic composition including X mole % of ZnO and (100−X) mole % of $Fe_2O_3$ (wherein $40 \leq X \leq 60$), and sintering is then effected with the resulting pre-sintered body to which at least one of $V_2O_5$, $Bi_2O_3$, MgO, $Al_2O_3$, $MoO_3$, $Sb_2O_3$, $SiO_2$, NiO, $SrO_2$ and PbO is further added in a proportion of 0.01–40% by weight.

12 Claims, 2 Drawing Figures

PROCESS FOR THE PREPARATION OF VOLTAGE NON-LINEARITY TYPE RESISTORS

FIELD OF THE INVENTION

The present invention relates to a process for the preparation of voltage non-linearity type resistors.

BACKGROUND OF THE INVENTION

The voltage-current characteristics of the voltage non-linearity type resistor are generally given in terms of the following expression:

$$I=(V/C)^\alpha$$

wherein
V is a voltage applied on a resistor,
I is a current flowing through the resistor,
C is a constant corresponding to a voltage generated when a given current is flowing, and
α is an index of a non-linearity coefficient.
The larger the index α, the better the non-linearity will be.

The voltage non-linearity type resistors used heretofore are based on SiO and ZnO. The SiO base resistors are prepared by sintering of SiO particles having a grain size of about 100 microns, and their voltage non-linearity characteristics are adjustable by varying the number of grain boundaries in the flowing direction of current. However, their non-linearity coefficient is relatively small and on the order of 3-7. Referring to SiO resistors for low-voltage applications, the number of grain boundaries should be reduced due to a high C value per one grain boundary. In consequence a problem arises wherein a reduction in the number of grain boundaries would lead to a drop of voltage resistance. Turning to the ZnO base resistors, they are advantageous in that they can be used in a wider range of voltage, since they generally have a coefficient of non-linearity of as high as 10-50 and a reduced grain size. However, ZnO resistors are disadvantageous in that it is difficult to produce the resistors since their non-linearity deteriorates with the lapse of time due to the chemical unstability of their main component ZnO. Thus, an increase in production cost occurs.

SUMMARY OF THE INVENTION

A main object of the present invention is therefore to provide improved voltage non-linearity type resistors excelling in both characteristics and stability.

According to the present invention, this object is achieved by the provision of a process for the preparation of voltage non-linearity type resistors, characterized in that pre-sintering is effected at a temperature of no lower than 700° C. with a basic composition comprising X mole % of ZnO and (100−X) mole % of $Fe_2O_3$ (wherein 40≦X≦60), and sintering is then effected with the resulting pre-sintered body to which at least one of $V_2O_5$, $Bi_2O_3$, MgO, $Al_2O_3$, $MoO_3$, $Sb_2O_3$, $SiO_2$, NiO, $SrO_2$ and PbO is further added in a proportion of 0.01–40% by weight.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become apparent from the following detailed description with reference to the drawings, in which.

DETAILED DESCRIPTION OF THE INVENTION

Figure 1:
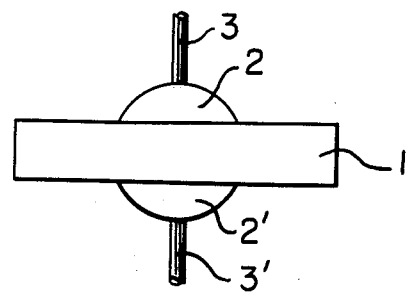
FIG. 1 is a side view of one embodiment of the resistor according to the present invention.
Figure 2:
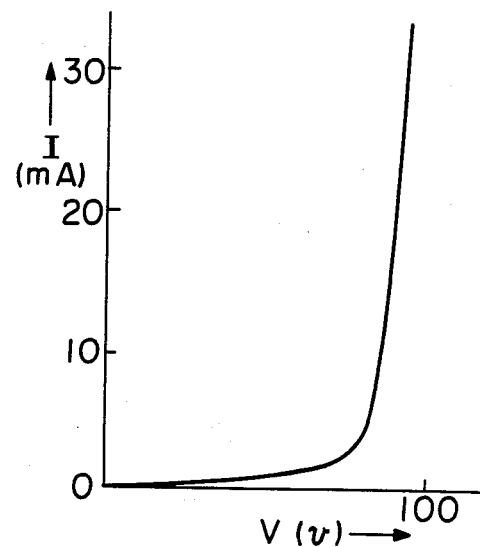
FIG. 2 is a view showing the voltage-current characteristics of the resistor illustrated in FIG. 1.

The voltage non-linearity type resistors of the present invention are prepared by two-stage sintering for the following reasons.

The reason why $ZnO/Fe_2O_3$ mixtures are pre-sintered at the first stage at a temperature of no lower than 700° C. is to obtain thermally and chemically stable zinc ferrite as a resistor substance offering a primary factor for non-linearity.

The reason for effecting (main) sintering at the second stage is to control the chemical reaction(s) between at least one of the high-resistive substances comprising mainly additives and zinc ferrite that is a low-resistive substance, thereby obtaining a structure wherein the zinc ferrite is surrounded by the high-resistive substance(s).

The amount of at least one of the aforesaid oxides is limited to a range of 0.01–40% by weight.

Experiments have revealed that good results are achieved within such a range regardless of the combinations of the oxides to be added. When the combined amount of the oxides is lower than the lower limit, the resultant high-resistive layer is of so narrow a width that neither increased voltage resistance nor increased α value is obtained due to tunnel currents, etc. When the combined amount of the oxides is higher than the upper limit, on the other hand, the resulting high-resistive layer is of so wide a width that the non-linearity is dependent upon dielectric break-down, and is adversely influenced by leakage currents such as Joule heat with the characteristics remaining unstable and reduced α values being obtained.

A comparison of the two-stage sintering with the single-stage sintering indicates that difficulties are encountered in the achievement of sufficient non-linearity and stability and the preparation of any desired voltage non-linearity type resistors in the case of single-stage sintering. However, voltage non-linearity type resistors excelling in both non-linearity and stability are obtained in the case of two-stage sintering.

The present invention will now be explained in detail with reference to the following non-restrictive examples. It is noted, however, that many changes or modifications may be made without departing the presently claimed scope.

EXAMPLE 1

Referring first to the single-stage sintering for the purpose of comparison:

X mole % of ZnO and (100−X) mole % of $Fe_2O_3$ were weighed within the range of 40≦X≦60, as set forth in Table 1, and $Bi_2O_3$ was weighed within the range of 0.01–40% by weight with respect to the combined amount of ZnO and $Fe_2O_3$. These starting materials were mixed together in a ball mill, compacted under a pressure of 2.0 ton/cm² into discs measuring 10×0.25 cm³, and sintered for 1 hour in an electric furnace. The temperature of the furnace was fixed at 900°–1300° C.

Referring secondly to the two-stage sintering according to the present invention:

As is the case with the comparative examples, X mole % of ZnO and (100−X) mole % of Fe₂O₃ were weighed within the range of 40≦X≦60, as set forth in Table 2. These starting materials were mixed together in a ball mill, compacted under a pressure of 2.0 ton/cm² into discs measuring 1.0φ×0.7 cm³, and placed in an electric furnace. The temperature of the furnace was fixed at 900°–1400° C. In this manner the disc compacts were sintered at various temperatures within that range for 1 hour. The thus obtained sintered bodies were ball-milled to obtain sintered powders of ZnO and Fe₂O₃. Subsequently, Bi₂O₃ was added to the powers in a proportion of 0.01–40% by weight to form powdery formulations. Thereupon, these formulations were compacted under a pressure of 1.0 ton/cm³ into discs measuring 10×0.35 cm³, and sintered in an electric furnace having its temperatures fixed at 700°–1000° C. to obtain voltage non-linearity type resistor bodies.

The resistor bodies obtained in this manner were provided with silver electrodes in the conventional manner to prepare voltage non-linearity type resistors, as illustrated in FIG. 1.

In FIG. 1, a resistor body 1 is connected to silver electrodes 2 and 2' having leads 3 and 3'. The voltage-current characteristics of the respective samples were measured with a standard circuit and at atmospheric conditions from which α, and V₁₀ₘₐ (a voltage impressed when 10 mA/cm² flows per 1 cm of the inter-electrode distance) were determined. The results are given with the composition of the sintered bodies in Tables 1 and 2.

TABLE 1

| Sample Nos. | ZnO to Fe₂O₃ mole ratio (%) ZnO | Fe₂O₃ | Additive and Amount (wt %) | | Sintering Temp. (°C.) | V₁₀ₘₐ (v) | α |
| --- | --- | --- | --- | --- | --- | --- | --- |
| 1 | 60 | 40 | Bi₂O₃ | 10 | 1300 | 75 | 7 |
| 2 | 55 | 45 | " | " | 1100 | 53 | 8 |
| 3 | 50 | 50 | " | " | 900 | 27 | 8 |
| 4 | 45 | 55 | " | " | 800 | 20 | 9 |
| 5 | 40 | 60 | " | " | 900 | 9 | 9 |
| 6 | 45 | 55 | " | 0.01 | 800 | 12 | 5 |
| 7 | " | " | " | 40 | " | 15 | 10 |

TABLE 2

| Sample Nos. | ZnO to Fe₂O₃ mole ratio (%) ZnO | Fe₂O₃ | Pre-Sintering Temp. (°C.) | Additive and Amount (wt %) | | Sintering Temp. (°C.) | V₁₀ₘₐ (v) | α |
| --- | --- | --- | --- | --- | --- | --- | --- | --- |
| 8 | 60 | 40 | 1400 | Bi₂O₃ | 10 | 800 | 92 | 30 |
| 9 | 55 | 45 | 1300 | " | " | " | 61 | 30 |
| 10 | 50 | 50 | 1100 | " | " | " | 21 | 32 |
| 11 | 45 | 55 | 900 | " | " | " | 15 | 31 |
| 12 | 40 | 60 | 1100 | " | " | " | 12 | 31 |
| 13 | 45 | 55 | 900 | " | " | 900 | 10 | 35 |
| 14 | " | " | 1000 | " | " | 900 | 25 | 25 |
| 15 | " | " | 900 | " | 0.01 | 800 | 30 | 19 |
| 16 | " | " | " | " | 40 | " | 13 | 18 |

From a comparison of Table 1 with Table 2, it is found that the two-stage sintering according to the present invention introduces considerable improvements in non-linearity.

EXAMPLE 2

The procedures of Example 1 were repeated, provided that Bi₂O₃, MgO and Al₂O₃ were added to the basic components ZnO and Fe₂O₃, thereby to obtain Samples Nos. 17–30.

According to the procedures of Example 1 the characteristics V₁₀ₘₐ and α of the samples were measured according to Example 1. The results are shown with the composition of the sintered bodies in Table 3 and 4.

TABLE 3

| Sample Nos. | ZnO to Fe₂O₃ mole ratio (%) ZnO | Fe₂O₃ | Additive and Amount (wt %) Bi₂O₃ | MgO | Al₂O₃ | Sintering Temp. (°C.) | V₁₀ₘₐ (v) | α |
| --- | --- | --- | --- | --- | --- | --- | --- | --- |
| 17 | 45 | 55 | 10 | 1 | — | 800 | 35 | 10 |
| 18 | " | " | " | 5 | — | " | 32 | 10 |
| 19 | " | " | " | 10 | — | " | 28 | 9 |
| 20 | " | " | " | — | 1 | " | 105 | 12 |
| 21 | " | " | " | — | 5 | " | 113 | 13 |
| 22 | " | " | " | — | 10 | " | 120 | 15 |
| 23 | " | " | " | 5 | 5 | " | 130 | 15 |

TABLE 4

| Sample Nos. | ZnO to Fe₂O₃ mole ratio (%) ZnO | Fe₂O₃ | Pre-Sintering Temp. (°C.) | Additive and Amount (wt %) Bi₂O₃ | MgO | Al₂O₃ | Sintering Temp. (°C.) | V₁₀ₘₐ (v) | α |
| --- | --- | --- | --- | --- | --- | --- | --- | --- | --- |
| 24 | 45 | 55 | 900 | 10 | 1 | — | 800 | 50 | 29 |
| 25 | " | " | " | " | 5 | — | " | 45 | 30 |
| 26 | " | " | " | " | 10 | — | " | 37 | 25 |
| 27 | " | " | " | " | — | 1 | " | 110 | 36 |
| 28 | " | " | " | " | — | 5 | " | 132 | 36 |
| 29 | " | " | " | " | — | 10 | " | 140 | 38 |
| 30 | " | " | " | " | 5 | 5 | " | 200 | 48 |

From a comparison of Table 3 with Table 4, it is noted that the two-stage sintering contribute to marked improvements in non-linearity, as is the case with Example 1. As Table 4 shows, the addition of two oxides MgO and/or Al₂O₃ in addition to Bi₂O₃ contributes to increases in V₁₀ₘₐ without causing a reduction in non-linearity.

EXAMPLE 3

To obtain Samples Nos. 31–44, the procedures of Example 1 were repeated, provided that Bi₂O₃, SiO₂ and NiO were added to the basic components ZnO and Fe₂O₃.

The characteristics V₁₀ₘₐ and α of the samples were measured according to Example 1. The results are given with the composition of the sintered bodies in Tables 5 and 6.

TABLE 5

| Sample Nos. | ZnO to Fe$_2$O$_3$ mole ratio (%) | | Additive and Amount (wt %) | | | Sintering Temp. (°C.) | V$_{10mA}$ (v) | α |
|---|---|---|---|---|---|---|---|---|
| | ZnO | Fe$_2$O$_3$ | Bi$_3$O$_3$ | SiO$_2$ | NiO | | | |
| 31 | 45 | 55 | 10 | 1 | — | 800 | 45 | 12 |
| 32 | " | " | " | 5 | — | " | 48 | 11 |
| 33 | " | " | " | 10 | — | " | 51 | 13 |
| 34 | " | " | " | — | 1 | " | 43 | 11 |
| 35 | " | " | " | — | 5 | " | 40 | 11 |
| 36 | " | " | " | — | 10 | " | 38 | 10 |
| 37 | " | " | " | 5 | 5 | " | 98 | 11 |

TABLE 6

| Sample Nos. | ZnO to Fe$_2$O$_3$ mole ratio (%) | | Pre-Sintering Temp. (°C.) | Additive and Amount (wt %) | | | Sintering Temp. (°C.) | V$_{10mA}$ (v) | α |
|---|---|---|---|---|---|---|---|---|---|
| | ZnO | Fe$_2$O$_3$ | | Bi$_2$O$_3$ | SiO$_2$ | NiO | | | |
| 38 | 45 | 55 | 900 | 10 | 1 | — | 800 | 55 | 30 |
| 39 | " | " | " | " | 5 | — | " | 60 | 30 |
| 40 | " | " | " | " | 10 | — | " | 67 | 32 |
| 41 | " | " | " | " | — | 1 | " | 55 | 35 |
| 42 | " | " | " | " | — | 5 | " | 51 | 30 |
| 43 | " | " | " | " | — | 10 | " | 48 | 31 |
| 44 | " | " | " | " | 5 | 5 | " | 150 | 45 |

As Table 6 shows, the two-stage sintering makes contribution to improvements in non-linearity. Furthermore, the addition of SiO$_2$ and/or NiO in addition to Bi$_2$O$_3$ gives rise to an increase in V$_{10mA}$ without incurring a reduction in non-linearity.

EXAMPLE 4

To obtain Sample Nos. 45–72, the procedures of Example 1 were repeated, provided that to the basic components ZnO and Fe$_2$O$_3$; Sb$_2$O$_3$, MoO$_3$, V$_2$O$_5$, PbO and SnO$_2$ were added as low-melting oxides and Al$_2$O$_3$, MgO, NiO and SiO$_2$ as high-resistive oxides.

The characteristics V$_{10mA}$ and α of the samples were measured according to Example 1. The results are given together with the composition of the sintered bodies in Tables 7 and 8.

TABLE 7

| Sample Nos. | ZnO to Fe$_2$O$_3$ mole ratio (%) | | Additive and Amount (wt %) | | | | Sintering Temp. (°C.) | V$_{10mA}$ (v) | α |
|---|---|---|---|---|---|---|---|---|---|
| | ZnO | Fe$_2$O$_3$ | | | | | | | |
| 45 | 45 | 55 | Sb$_2$O$_3$ | 0.1 | Al$_2$O$_3$ | 5 | 1300 | 48 | 9 |
| 46 | " | " | Sb$_2$O$_3$ | 1.0 | Al$_2$O$_3$ | 5 | 1000 | 32 | 7 |
| 47 | " | " | Sb$_2$O$_3$ | 10 | Al$_2$O$_3$ | 5 | 800 | 18 | 9 |
| 48 | " | " | MoO$_3$ | 10 | Al$_2$O$_3$ | 5 | " | 41 | 10 |
| 49 | " | " | MoO$_3$ | 10 | MgO | 5 | " | 29 | 8 |
| 50 | " | " | V$_2$O$_5$ | 10 | MgO | 5 | " | 27 | 7 |
| 51 | " | " | V$_2$O$_5$ | 10 | NiO | 5 | " | 18 | 10 |
| 52 | " | " | PbO | 10 | NiO | 5 | " | 26 | 10 |
| 53 | " | " | PbO | 10 | SiO$_2$ | 5 | " | 32 | 11 |
| 54 | " | " | SrO$_2$ | 10 | SiO$_2$ | 5 | " | 30 | 12 |
| 55 | " | " | V$_2$O$_5$ | 5 | MoO$_3$ | 5 | " | 32 | 11 |
| | | | | MgO 5 | | | | | |
| 56 | " | " | MoO$_3$ | 5 | Sb$_2$O$_3$ | 5 | " | 35 | 12 |
| | | | | Al$_2$O$_3$ 5 | | | | | |
| 57 | " | " | SrO$_2$ | 5 | PbO | 5 | " | 49 | 12 |
| | | | | SiO$_2$ 5 | | | | | |
| 58 | " | " | PbO | 5 | V$_2$O$_5$ | 5 | " | 23 | 12 |
| | | | NiO | | 5 | | | | |

TABLE 8

| Sample Nos. | ZnO to Fe$_2$O$_3$ mole ratio (%) | | Pre-Sintering Temp. (°C.) | Additive and Amount (wt %) | | | | Sintering Temp. (°C.) | V$_{10mA}$ (v) | α |
|---|---|---|---|---|---|---|---|---|---|---|
| | ZnO | Fe$_2$O$_3$ | | | | | | | | |
| 59 | 45 | 55 | 1400 | Sb$_2$O$_3$ | 0.1 | Al$_2$O$_3$ | 5 | 800 | 53 | 20 |
| 60 | " | " | 1200 | Sb$_2$O$_3$ | 10 | Al$_2$O$_3$ | 5 | " | 41 | 18 |
| 61 | " | " | 900 | Sb$_2$O$_3$ | 10 | Al$_2$O$_3$ | 5 | " | 20 | 21 |
| 62 | " | " | " | MoO$_3$ | 10 | Al$_2$O$_3$ | 5 | " | 40 | 20 |
| 63 | " | " | " | MoO$_3$ | 10 | MgO | 5 | " | 51 | 27 |
| 64 | " | " | " | V$_2$O$_5$ | 10 | MgO | 5 | " | 36 | 23 |
| 65 | " | " | " | V$_2$O$_5$ | 10 | NiO | 5 | " | 30 | 27 |
| 66 | " | " | " | PbO | 10 | NiO | 5 | " | 32 | 29 |
| 67 | " | " | " | PbO | 10 | SiO$_2$ | 5 | " | 41 | 29 |
| 68 | " | " | " | SrO$_2$ | 10 | SiO$_2$ | 5 | " | 33 | 25 |
| 69 | " | " | " | V$_2$O$_5$ | 5 | MoO$_3$ | 5 | " | 63 | 39 |
| | | | | | MgO 5 | | | | | |
| 70 | " | " | " | MoO$_3$ | 5 | Sb$_2$O$_3$ | 5 | " | 77 | 42 |
| | | | | | Al$_2$O$_3$ 5 | | | | | |
| 71 | " | " | " | SrO$_2$ | 5 | PbO | 5 | " | 81 | 36 |
| | | | | | SiO$_2$ 176 5 | | | | | |
| 72 | " | " | " | PbO | 5 | V$_2$O$_5$ | 5 | " | 54 | 35 |

TABLE 8-continued

| Sample Nos. | ZnO to Fe₂O₃ mole ratio (%) ZnO | Fe₂O₃ | Pre-Sintering Temp. (°C.) | Additive and Amount (wt %) | Sintering Temp. (°C.) | $V_{10mA}$ (v) | α |
|---|---|---|---|---|---|---|---|
| | | | | NiO 5 | | | |

As set forth in Table 8, the two-stage sintering according to the present invention serves to improve non-linearity.

As stated in the foregoing, the voltage non-linearity type resistors according to the present invention are improved in respect of non-linearity and stability by the application of the two-stage sintering, and thus offer many advantages from the industrial standpoint.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for the preparation of voltage non-linearity type resistors comprising:
   (a) pre-sintering a ZnO/Fe₂O₃ composition comprising X mole % of ZnO and (100−X) mole % of Fe₂O₃, wherein 40≦X≦60, to produce a pre-sintered body;
   (b) powdering said pre-sintered body to produce sintered powders;
   (c) adding to said sintered powders at least one member selected from the group consisting of V₂O₅, Bi₂O₃, MgO, Al₂O₃, MoO₃, Sb₂O₃, SiO₂, NiO, SrO₂ and PbO in an amount of from about 0.01 to 40% by weight; and
   (d) compacting and sintering the resulting formulation to obtain a voltage non-linearity type resistor body.

2. A process as in claim 1, wherein said pre-sintering step is effected at a temperature of at least 700° C.

3. A process as in claim 2, wherein said pre-sintering step is effected at a temperature of from 900°–1400° C.

4. A process as in claim 3, wherein said pre-sintering step is effected at a temperature of from 800°–1300° C.

5. A process as in claim 1, wherein Bi₂O₃ is added to said sintered powders.

6. A process as in claim 1, wherein Bi₂O₃ and MgO are added to said sintered powders.

7. A process as in claim 1, wherein Bi₂O₃ and Al₂O₃ are added to said sintered powders.

8. A process for the preparation of voltage non-linearity type resistors comprising:
   (a) pre-sintering a ZnO/Fe₂O₃ composition comprising X mole % of ZnO and (100−X) mole % of Fe₂O₃, wherein 40≦X≦60, to provide a pre-sintered body, said pre-sintering being effected at a temperature of at least 700° C.;
   (b) powdering said pre-sintered body to produce sintered powders;
   (c) adding to said sintered powders at least one member selected from the group consisting of V₂O₅, Bi₂O₃, MgO, Al₂O₃, MoO₃, Sb₂O₃, SiO₂, NiO, SnO₂ and PbO in an amount of from about 0.01 to 40% by weight; and
   (d) compacting and sintering the resulting formulation at a temperature of 700°–1300° C. to obtain a voltage non-linearity type resistor body.

9. A process as in claim 12, wherein said pre-sintering step is effected at a temperature of from 900°–1400° C. and said sintering step is effected at a temperature of from 800°–1300° C.

10. A process as in claim 12, wherein Bi₂O₃ is added to said sintered powders.

11. A process as in claim 12, wherein Bi₂O₃ and MgO are added to said sintered powders.

12. A process as in claim 12, wherein Bi₂O₃ and Al₂O₃ are added to said sintered powders.

* * * * *